US008789658B2

(12) United States Patent
Göser

(10) Patent No.: US 8,789,658 B2
(45) Date of Patent: Jul. 29, 2014

(54) TRACTION DEVICE, TRACTION SYSTEM INCORPORATING SAID TRACTION DEVICE AND AN ELEVATOR ARRANGEMENT INCORPORATING SAID TRACTION SYSTEM

(75) Inventor: Hubert Göser, Dannenberg (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 331 days.

(21) Appl. No.: 13/104,739

(22) Filed: May 10, 2011

(65) Prior Publication Data

US 2011/0226563 A1 Sep. 22, 2011

Related U.S. Application Data

(63) Continuation of application No. PCT/EP2009/062658, filed on Sep. 30, 2009.

(30) Foreign Application Priority Data

Nov. 10, 2008 (DE) ......................... 10 2008 037 536

(51) Int. Cl.

| | |
|---|---|
| ***B66B 7/06*** | (2006.01) |
| ***F16G 1/16*** | (2006.01) |
| ***F16G 1/28*** | (2006.01) |
| ***B66B 11/08*** | (2006.01) |
| ***F16G 5/20*** | (2006.01) |
| ***D07B 1/22*** | (2006.01) |

(52) U.S. Cl.
USPC ........... 187/255; 187/254; 474/203; 474/205; 474/252; 474/260

(58) Field of Classification Search
CPC ......... B66B 7/062; B66B 11/008; F16G 1/28; F16G 1/16
USPC .......... 187/251, 255, 266; 474/203, 204, 205, 474/238, 240, 247, 252, 260, 264, 270
IPC ..... B66B 7/06,11/08, 15/02, 15/04; F16G 1/08, F16G 1/16, 5/06, 5/20; D07B 1/16, 1/22
See application file for complete search history.

(56) References Cited

U.S. PATENT DOCUMENTS

| | | | | |
|---|---|---|---|---|
| 6,371,448 | B1 * | 4/2002 | De Angelis | 254/374 |
| 6,508,051 | B1 * | 1/2003 | De Angelis | 57/223 |
| 6,739,433 | B1 | 5/2004 | Baranda et al. | |
| 7,757,817 | B2 | 7/2010 | Ach | |
| 7,770,328 | B2 | 8/2010 | Vanderbeken et al. | |
| 2006/0180402 | A1 | 8/2006 | Silberhorn et al. | |
| 2007/0221452 | A1 * | 9/2007 | Aguirre et al. | 187/373 |
| 2008/0081721 | A1 | 4/2008 | Bissig et al. | |
| 2010/0009184 | A1 | 1/2010 | Bruyneel et al. | |
| 2010/0044158 | A1 | 2/2010 | Goeser | |
| 2010/0133046 | A1 * | 6/2010 | Allwardt et al. | 187/251 |
| 2013/0042939 | A1 * | 2/2013 | Wesson et al. | 139/11 |

FOREIGN PATENT DOCUMENTS

| | | | | | |
|---|---|---|---|---|---|
| DE | 1406220 | A1 * | 10/1968 | B66B 7/06 |
| DE | 3411772 | A1 * | 5/1985 | F16G 1/28 |
| EP | 1 396 458 | A2 | 3/2004 | |
| EP | 1 746 061 | A1 | 1/2007 | |
| JP | 2004218099 | A * | 8/2004 | D07B 1/16 |
| JP | 2009281555 | A * | 12/2009 | F16G 5/20 |
| JP | 2010175013 | A * | 8/2010 | F16G 5/06 |
| WO | WO 2009050182 | A2 * | 4/2009 | B66B 15/04 |

OTHER PUBLICATIONS

EPO Machine Translation, DE3411772, Jun. 5, 2012, pp. 1-3.*
International Search Report dated Nov. 19, 2009 of international application PCT/EP 2009/062658 on which this application is based.

* cited by examiner

*Primary Examiner* — William A Rivera
*Assistant Examiner* — Stefan Kruer
(74) *Attorney, Agent, or Firm* — Walter Ottesen P.A.

(57) ABSTRACT

A traction device includes tension members (2) coated with an elastomer material to form jacketed tension members (3). The jacketed tension members (3) are arranged next to each other in a plane in the cross section of the traction device, at such a distance from each other that there is a clear space (6) between each two mutually adjacent ones of the jacketed tension members (3). The jacketed tension members (3) are connected at the back thereof by a back layer. The clear space (6) begins on the side facing away from the back layer (4) and extends at least beyond the center point (5) of the tension member, and the ratio of the second diameter (d2) of the jacketed tension member (3) in relation to the first diameter (d1) of the tension member (2) is between 1.05 and 2.25. The invention is also directed to a traction system which includes the traction device which can be driven by at least one traction sheave (9), and each jacketed tension member (3) engages in a corresponding groove (10) of the traction sheave (9). The back layer (4) is arranged on the side of the jacketed tension members (3) that faces away from the side engaging in the grooves (10) of the traction sheave (9). At least one tension member (2) engages in the corresponding groove (10) of the traction sheave (9) by between 5% and 25% of its diameter (d1).

23 Claims, 1 Drawing Sheet

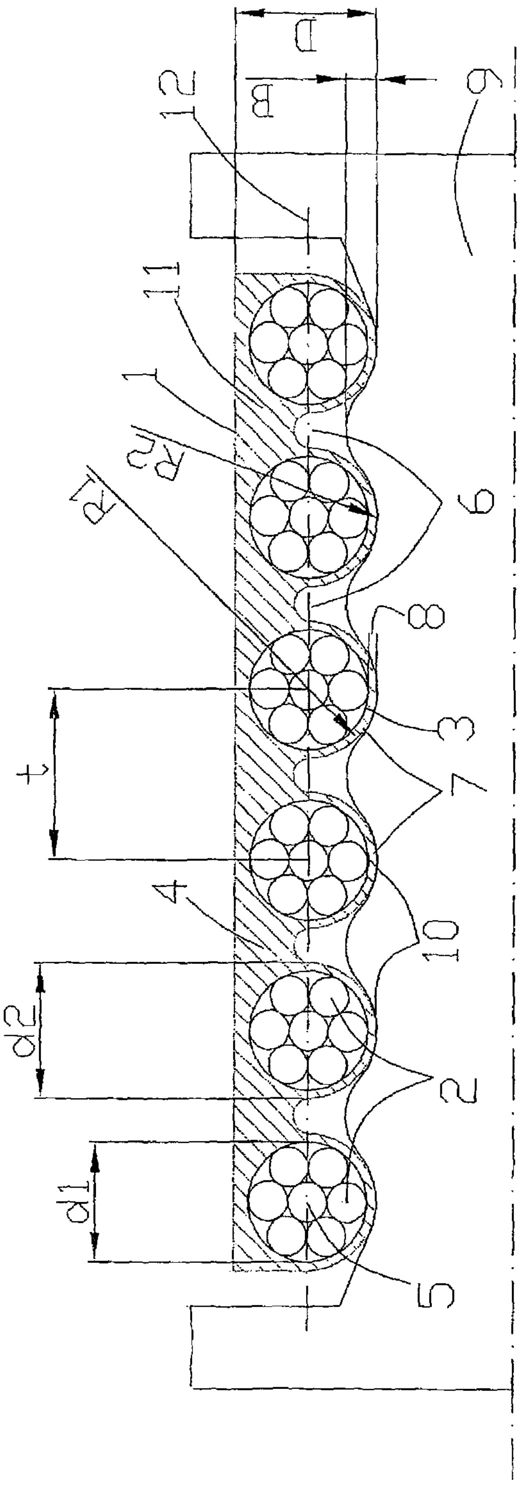
D
B
12
9
11
1
R2
R1
6
8
t
3
7
10
4
d2
2
d1
5

TRACTION DEVICE, TRACTION SYSTEM INCORPORATING SAID TRACTION DEVICE AND AN ELEVATOR ARRANGEMENT INCORPORATING SAID TRACTION SYSTEM

CROSS REFERENCE TO RELATED APPLICATIONS

This application is a continuation application of international patent application PCT/EP2009/062658, filed Sep. 30, 2009, designating the United States and claiming priority from German application 10 2008 037 536.5, filed Nov. 10, 2008, and the entire content of both applications is incorporated herein by reference.

FIELD OF THE INVENTION

The invention relates to a traction device, especially for an elevator arrangement, a traction system including the traction device and at least one traction sheave, and an elevator arrangement which includes the traction system.

BACKGROUND OF THE INVENTION

Traction devices and traction systems for elevator arrangements are known to those skilled in the art. Ropes or belts are frequently used, with flat belts, V-ribbed belts or toothed belts being used as belts.

Where ropes are used as a traction device, each individual rope is clearly assigned a dedicated rope groove on the traction sheave or other sheave that drives the traction device. In this arrangement, each rope penetrates with at least part of the diameter thereof into the associated rope groove. Each individual rope is an independent tension element and can also be operated individually. For higher power requirements, it is possible to use either a plurality of ropes in parallel or the rope diameter can be increased. The individual rope is not only a traction device for transmitting the pulling forces but also participates directly in the transmission of the traction forces. Ropes as a traction device have the advantage that the force can be transmitted directly from the traction sheave to the ropes.

Where belts are used as a traction device, a plurality of adjacent ropes as tension members are always embedded in a common elastomer belt body. Here, the tension members are completely jacketed and surrounded by the elastomer material of the belt body and embedded therein. The plane of the tension members is far above the contact surface formed by the belt with the corresponding belt sheave, it being possible to consider the belt toothing as the contact surface in the case of toothed belts, the plane of the V as the contact surface in the case of V ribs, and the flat belt surface itself as the contact surface in the case of flat belts. A rubber layer, which is thick in comparison with the diameter of the tension member, is arranged between the tension member and the corresponding belt sheave. Here, the tension members are exclusively responsible for transmitting the pulling forces, while the elastomer material transmits the traction forces. The belt as a traction device, especially the elastomer region between the tension members and the contact surface, is thus exposed to high shear and shearing stresses during operation, and there is therefore the risk of fatigue in the elastomer material.

EP 1 396 458 A2 discloses an elevator device, for example, in which a flat belt made of elastomer material reinforced with tension members is used as a traction device. U.S. Pat. No. 7,757,817 B2 discloses an elevator system having a V-ribbed belt.

Compared with individual ropes, belts offer the advantage, on the one hand, that handling is simpler since, when constructing or servicing the belt drive, it is not necessary to lay each individual rope onto each corresponding groove of the traction sheave but only the elastomer body in which the tension members are embedded. Moreover, small traction sheave diameters can be employed since the embedded tension members generally have relatively small diameters. Moreover, belts as a traction device are virtually maintenance-free since no lubrication is required. However, the force that can be transmitted is dependent not only on the friction between the traction sheave and the elastomer but also, inter alia, on the shear strength of the elastomer material. Owing to the shear on the elastomer material, a belt of this kind is prone to fatigue.

For safety reasons, at least two and, in general, three to five belts must always be used in parallel in elevator installations. Since the belts contain a large number of thin tension members (individual ropes), the belt is relatively wide in comparison with a rope of the same strength. If a plurality of belts is now used in parallel, relatively wide traction sheaves and direction-changing sheaves are required.

U.S. Pat. No. 6,739,433 discloses a traction device for an elevator installation which is embodied as a profiled flat belt, thus increasing the size of the surface available for friction between the traction sheave and the belt. The force that can be transmitted is thus greater than in the case of an unprofiled flat belt but, here too, the zone of force transmission between the traction sheave and the traction device is still a significant distance from the tension members, owing to the elastomer layer of the elastomer body, which is thick in comparison with the diameter of a tension member, with the result that the elastomer material of the flat belt is likewise subjected to severe shear stress.

U.S. patent application publication 2010/0044158 A1 discloses a traction device which includes a plurality of tension members in the form of steel ropes arranged adjacent to each other and at a distance from each other, which are jacketed with elastomer and are connected by a common back layer.

SUMMARY OF THE INVENTION

It is an object of the invention to provide a traction device of the type described above which is simple to handle and which can transmit high pulling forces efficiently without the risk of premature fatigue of the material. With respect to the traction system, which includes the traction device and the traction sheave, it should be possible to transmit high pulling forces without the risk of premature fatigue of the material, and a drive unit of narrower construction should be required as compared with the known belt systems.

With respect to the traction device, this object is achieved by virtue of the fact that the traction device has tension members which are jacketed with elastomer material to form jacketed tension members, wherein, in the cross section of the traction device, the jacketed tension members are arranged next to each other in one plane at such a distance from each other that a space is formed between two jacketed tension members, wherein the jacketed tension members are connected at the rear by a back layer, wherein, beginning on the side facing away from the back layer, the space extends at least beyond the central point of the tension member, and wherein the ratio of the second diameter of the jacketed tension member to the first diameter of the tension member is between 1.05 and 2.25.

In a manner which is completely surprising for a person skilled in the art, this arrangement combines the advantages of belt technology with those of rope technology in a synergistic fashion. The traction device according to the invention, which can also be referred to as a “composite rope”, is simple to handle and is virtually maintenance-free.

The traction device according to the invention includes a plurality of tension members, which are comparable with a plurality of individual ropes in rope technology. The tension members are jacketed with an elastomer layer, which is very thin relative to the diameter of the tension member, and are connected by a back layer. On the broad side of the tension members, which can be laid on the traction sheave, the tension members are separated from the traction surface only by a very thin elastomer layer. This has the advantage that the thin jacketing material of the tension members is subjected to only slight shear stress and that there is hardly any fatigue of the material but that the forces can be transmitted very effectively. The ratio of the second diameter of the jacketed tension member to the first diameter of the tension member can be measured in the plane generated by the centers of the tension members, for example.

By virtue of the fact that there is a clear space between the jacketed tension members, weight saving and hence ease of handling are achieved. Moreover, the clear space enables the tension members of the traction device to engage in corresponding grooves of the traction sheave with which the traction device can interact.

With respect to the traction system, the object is achieved by virtue of the fact that the traction system includes a traction device, which is described herein, and at least one traction sheave, through which the traction device can be driven. Each jacketed tension member of the traction device engages in a corresponding groove of the traction sheave. The elastomer back layer is arranged on the side of the tension members which faces away from the side which engages in the grooves of the traction sheave, and wherein at least one bare tension member engages by at least 5% of the diameter thereof in the corresponding groove of the traction sheave.

Owing to the fact that the tension members engage directly in the grooves of the traction sheave, high force transmission is possible. The zone of force transmission between the traction sheave and the traction device is directly in the zone of engagement. Owing to the small thickness of the jacket, the shear strength thereof is of only very minor significance. An efficiently operating traction system is provided, by which high pulling forces can be transmitted without the risk of premature fatigue of the material of the traction device. Only one traction device according to the invention is required rather than a plurality of ropes, as in rope systems, or a plurality of belts, as in belt systems, thus making it possible to use a drive unit of narrower construction. It is possible to use comparatively thin tension members in the traction device according to the invention, thus making it possible to use small traction sheave diameters and narrow traction sheaves in construction. For each traction device, just one connecting element is required for attachment to the elements which are, for example, to be lifted.

It is advantageous if the thickness of the jacket of the tension member is in a range of from 0.2 to 2 mm. In a preferred embodiment of the invention, the thickness of the jacket of the tension member is in a range of from 0.5 to 1 mm. Given these small thicknesses of the jacket, the jacket is subjected to particularly low levels of shear, and the pulling force that can be transmitted is correspondingly high. The life of the traction device and the handling characteristics thereof are improved.

In one embodiment, the jacket of the tension members and the back layer are composed of the same material.

In another embodiment of the invention, the jacket is composed of a first elastomer, which differs from a second elastomer of the back layer. By using different elastomers, it is possible to employ a particularly wide variety of combinations of material, thus enabling the traction device to be adapted individually to a large number of applications.

The elastomer or the elastomers is advantageously or are preferably a polyurethane or polyurethanes. Polyurethane has both good friction and good adhesion properties and is relatively insensitive to shear.

In a preferred embodiment of the invention, the jacket of the individual ropes has an outer contour facing the traction sheave, the cross section of which is in the shape of a partial circle. The jacket of the tension members, which are approximately circular in cross section in all the embodiments, is given a uniform thickness around the tension member. The shear stresses during the operation of the traction system are lowest in this embodiment.

In other embodiments of the invention, the cross section of the outer contour is not in the shape of a partial circle but is, for example, of trapezoidal, conical, elliptical, arcuate or square design. Adopting different geometries for the cross sections of the jacket has the advantage that the composite rope can thus be adapted to a large number of traction sheave profiles.

In an embodiment of the invention, the ratio of the overall diameter of the jacketed tension members (d2) to the thickness (D) of the composite is ≤1. This reduces the loading on the material underneath the tension member, especially during the deflection of the back of the traction device over a smooth sheave. If d2 were equal to D, the layer thickness on the back of the traction device would be equal to the layer thickness on the traction side, and the loading on the material during the deflection of the back of the traction device over a smooth sheave would be very high.

In an embodiment of the invention, the back layer has a thickness (c), (c) being ≤ half the thickness (D) of the traction device. However, the thickness (c) can be variable, the thickness (c) being less above the central point of the tension member than between the tension members above the clear space. At its thinnest point, (c) is at least equal to the layer thickness of the jacket. The maximum layer thickness of (c) should not exceed ½ D since otherwise bending flexibility is greatly reduced and larger bending diameters are necessary.

According to an embodiment of the invention, the individual ropes of the composite rope are spaced apart in such a way that the spacing between the centers of the individual ropes is less than or equal to five times the diameter (d1) of the unjacketed tension members and is at least d1+1.5 mm.

These geometrical ratios, which can be combined with one another, allow optimum design of the traction device, thus ensuring that the advantages over flat belts are retained, and that the tension members engage in the grooves of the traction sheave and can transmit the forces in an optimum manner.

In another embodiment of the invention, the back layer has a profiled surface on the side thereof which faces away from the traction sheave. This profiling serves to improve the guidance of the traction device when it has to be guided around direction-changing sheaves by way of the back.

In another embodiment of the invention, each traction device has at least four tension members. Protection against twisting of the traction device is improved, thus ensuring that it runs reliably into the zone of engagement of the traction sheave.

Steel ropes are preferably used as tension members. In an embodiment of the invention, the ropes of a traction device are arranged alternately with an S-lay and a Z-lay. This minimizes the risk of load-dependent twisting. Using an even number of ropes in a traction device improves this effect. Steel combines high tensile strength and reverse bending strength with good adhesion to elastomers.

In an embodiment of the invention, the diameter of the individual ropes is between 1.5 mm and 8 mm, preferably between 1.8 and 5.5 mm, particularly preferably between 2 and 4 mm. In this diameter range, the relationship between a minimum traction sheave diameter and high bearing load is particularly good.

According to an embodiment of the invention, the side of the traction device which faces away from the traction sheave has a top coating. According to an embodiment of the invention, the top coating is formed from a sheet-like textile, for example, a woven fabric. With such a coating, it is possible to improve both the friction and the wear resistance of the traction device.

The ratio of the second diameter of the jacketed tension member to the first diameter of the tension member is preferably between 1.2 and 1.6.

Another significant feature of the traction system according to the invention is that at least the vertex of the jacketed tension member rests on the surface of the corresponding groove of the traction sheave.

BRIEF DESCRIPTION OF THE DRAWING

The invention will now be described with reference to the single FIGURE of the drawing (FIG. 1) which shows a cross section through a traction system, which is suitable, in particular, for use in an elevator arrangement.

DESCRIPTION OF THE PREFERRED EMBODIMENTS OF THE INVENTION

The traction system has a traction device 1 and a traction sheave 9 for driving the traction device 1.

The traction device 1 has six tension members 2, which are jacketed by elastomer material 11 to form jacketed tension members 3. The tension members 2 are steel ropes. In a cross-sectional view of the traction device, the jacketed tension members 3 are arranged next to each other in one plane at such a distance from each other that a clear space 6 is formed between two directly adjacent jacketed tension members 3. The jacketed tension members 3 are connected at the rear by a back layer 4. The clear space 6 begins on the side facing away from the back layer 4 and extends beyond a plane 12 defined by the center points 5 of the tension members 2. The diameter (d2) of the jacketed tension member 3 is 3.5 mm, and the diameter (d1) of the bare, unjacketed tension member 2 is 2.5 mm. The ratio of the second diameter (d2) of the jacketed tension member 3 to the first diameter (d1) of the tension member 2 is 1.4. At 0.5 mm, the jacketing of the tension member 2 with elastomer material is comparatively thin. This has the advantage that the jacketing material is subjected to only slight shear stress, and the elastomer material does not suffer significant fatigue. Moreover, the forces of the traction sheave can be transmitted very effectively.

The jacket 7 of the tension members 2 has an outer contour facing the traction sheave 9, the cross section of which corresponds to the shape of a partial circle and has a radius R1 of 1.75 mm. The broad side of the traction device which faces the traction sheave 9 consists of partially circular shapes, with the sheathed steel ropes forming the partially circular shapes engaging in corresponding grooves 10 in the traction sheave 9. The grooves 10 have a contour which corresponds to the shape of a partial circle with the radius R2 of 1.85 mm. It is particularly important that the tension members 2 engage by at least 5% the grooves 10 of the traction sheave 9 without and notwithstanding their elastomer jacket.

The jacket of the tension members and the back layer 4 are composed of polyurethane. The ratio of the diameter (d2) of the jacketed tension member (3) to the overall thickness (D) of the traction device (1) is D=0.95. The back layer 4 has a thickness (c), (c) being ≤1 mm at the thinnest point thereof. The tension members 2 of the traction device 1 are spaced apart in such a way that the spacing (t) between the centers 5 of the tension members 2 is 4.5 mm.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description

1 traction device
2 tension member
3 jacketed tension member
4 back layer
5 center point of the cross section of the tension member
6 clear space
7 jacket of the tension member
8 thickness of the jacket of the tension member
9 traction sheave
10 groove of the traction sheave
11 elastomer material
12 plane
d1 diameter of the tension member
d2 diameter of the jacketed tension member
D thickness of the traction device
c thickness of the back layer
t spacing between the center points of two directly adjacent tension members
R1 radius of the jacketed tension member
R2 radius of the groove of the traction sheave

What is claimed is:

1. A traction device comprising:

a cross section defining a plane;

a plurality of tension members each having a first diameter (d1);

an elastomer material configured as a jacketing of said tension members so as to form a plurality of jacketed tension members;

said jacketed tension members having respective outer surfaces and being arranged one adjacent the other in said plane of said cross section and said jacketed tension members each having a second diameter (d2);

said jacketed tension members having a back side and a front side and being arranged so as to define a clear space between each two mutually adjacent ones of said jacketed tension members;

a back layer connecting said jacketed tension members together at said back side of said jacketed tension members;

said jacketed tension members having respective center points conjointly defining a center line;

said jacketed tension members being all of like configuration below said center line and said clear spaces extending from said front side of said jacketed tension members and to beyond said center line toward said back side;

said second diameter (d2) of said jacketed tension members having a ratio to said first diameter (d1) of said tension members between 1.2 and 1.6; and, said ratio (d2/d1) being constant up to said center line whereat said outer surfaces intersect said center line and whereat respective tangents drawn to said outer surfaces are perpendicular to said center line and are mutually parallel.

2. The traction device of claim 1, wherein said jacketing of said tension members has a thickness of 0.2 mm to 2 mm.

3. The traction device of claim 2, wherein said thickness is between 0.5 mm and 1 mm.

4. The traction device of claim 1, wherein said tension members are ropes.

5. The traction device of claim 4, wherein said ropes alternately have an S-lay and a Z-lay.

6. The traction device of claim 1, further comprising a top coating configured as the surface of said back layer.

7. The traction device of claim 6, wherein said top coating is formed from a sheet-like textile.

8. The traction device of claim 6, wherein said top coating is formed from a fabric.

9. The traction device of claim 1, wherein said jacket of said tension members is made of a first elastomer material; and, said back layer is formed from a second elastomer material which is different from said first elastomer material.

10. The traction device of claim 1, wherein said elastomer material is a polyurethane.

11. The traction device of claim 1, wherein said jacket of said tension members has an outer contour on said front side; and, said outer contour has a cross section in the shape of a partial circle.

12. The traction device of claim 1, wherein said jacket of said tension members has an outer contour configured to face a traction sheave; and, said outer contour has a cross section whose shape deviates from a partial circular shape.

13. The traction device of claim 1, wherein said traction device has an overall thickness (D); and, said second diameter (d2) has a ratio to said overall thickness (D) of ≤1.

14. The traction device of claim 1, wherein said traction device has an overall thickness (D); and, said back layer has a thickness (c) being ≤half of said thickness (D) at said back layer's thinnest point.

15. The traction device of claim 1, wherein said tension members are spaced so as to define a distance (t) between said center points of mutually adjacent ones of said tension members; and, said distance (t) is at most five times greater in length than said first diameter (d1) and is at least 1.5 mm greater in length than said first diameter (d1).

16. The traction device of claim 1, wherein said back layer has a profiled surface.

17. The traction device of claim 1, wherein said tension members are at least four in number.

18. The traction device of claim 1, wherein said tension members are steel ropes.

19. The traction device of claim 1, wherein said plurality of said tension members constitutes an even number.

20. The traction device of claim 1, wherein said first diameter (d1) of said tension members is between 1.5 mm and 1.8 mm.

21. A traction system comprising:

a traction device having a cross section defining a plane;

said traction device having a plurality of tension members each having a first diameter (d1);

an elastomer material configured as a jacketing of said tension members so as to form jacketed tension members;

said jacketed tension members having respective outer surfaces and being arranged adjacent to each other in said plane and said jacketed tension members each having a second diameter (d2);

said jacketed tension members having a back side and a front side and being arranged so as to define a clear space between each two mutually adjacent ones of said jacketed tension members;

a back layer connecting said jacketed tension members together at said back side of said jacketed tension members;

said jacketed tension members having respective center points conjointly defining a center line; said jacketed tension members being all of like configuration below said center line and said clear spaces extending from said front side of said jacketed tension members to beyond said center line toward said back side;

said second diameter (d2) of said jacketed tension members having a ratio to said first diameter (d1) of said tension members between 1.2 and 1.6; said ratio (d2/d1) being constant up to said center line whereat said outer surfaces intersect said center line and whereat respective tangents drawn to said outer surfaces are perpendicular to said center line and are mutually parallel;

a traction sheave having a plurality of grooves for receiving corresponding ones of said jacketed tension members in contact engagement therewith and said traction sheave being configured to drive said traction device;

said back side of said jacketed tension members being configured to face away from said traction sheave;

said jacketed tension members being configured to engage in said corresponding grooves of said traction sheave so as to cause at least one of said jacketed tension members to engage with at least 5% of said first diameter (d1); and, said jacket of said tension members being given a uniform thickness around each respective tension member.

22. An elevator arrangement including an elevator, the arrangement comprising:

a traction system having a traction device connected to said elevator and having a cross section defining a plane;

said traction device having a plurality of tension members each having a first diameter (d1);

an elastomer material configured as a jacketing of said tension members so as to form jacketed tension members;

said jacketed tension members having respective outer surfaces and being arranged adjacent to each other in said plane and said jacketed tension members each having a second diameter (d2);

said jacketed tension members having a back side and a front side and being arranged so as to define a clear space between each two mutually adjacent ones of said jacketed tension members;

a back layer connecting said jacketed tension members together at said back side of said jacketed tension members;

said jacketed tension members having respective center points conjointly defining a center line; said jacketed tension members being all of like configuration below said center line and said clear spaces extending from said front side of said jacketed tension members to beyond said center line toward said back side;

said second diameter (d2) of said jacketed tension members having a ratio to said first diameter (d1) of said tension members between 1.2 and 1.6; said ratio (d2/d1) being constant up to said center line whereat said outer surfaces intersect said center line and whereat respective tangents drawn to said outer surfaces are perpendicular to said center line and are mutually parallel;

said traction system further including a traction sheave having a plurality of grooves for receiving corresponding ones of said jacketed tension members in contact engagement therewith and said traction sheave being configured to drive said traction device;

said back side of said jacketed tension members being configured to face away from said traction sheave;

said jacketed tension members being configured to engage in said corresponding grooves of said traction sheave so as to cause at least one of said jacketed tension members to engage with at least 5% of said first diameter (d1); and, said jacket of said tension members being given a uniform thickness around each respective tension member.

23. A traction system comprising:

a traction device having a cross section defining a plane;

said traction device having a plurality of tension members each having a first diameter (d1);

an elastomer material configured as a jacketing of said tension members so as to form jacketed tension members;

said jacketed tension members having respective outer surfaces and being arranged adjacent to each other in said plane and said jacketed tension members each having a second diameter (d2);

said jacketed tension members having a back side and a front side and being arranged so as to define a clear space between each two mutually adjacent ones of said jacketed tension members;

a back layer connecting said jacketed tension members together at said back side of said jacketed tension members;

said jacketed tension members having respective center points conjointly defining a center line; said jacketed tension members being all of like configuration below said center line and said clear spaces extending from said front side of said jacketed tension members to beyond said center line toward said back side;

said second diameter (d2) of said jacketed tension members having a ratio to said first diameter (d1) of said tension members between 1.2 and 1.6; said ratio (d2/d1) being constant up to said center line whereat said outer surfaces intersect said center line and whereat respective tangents drawn to said outer surfaces are perpendicular to said center line and are mutually parallel;

a traction sheave having a plurality of grooves for receiving corresponding ones of said jacketed tension members in contact engagement therewith and said traction sheave being configured to drive said traction device;

said back side of said jacketed tension members being configured to face away from said traction sheave;

said jacketed tension members being configured to engage in said corresponding grooves of said traction sheave so as to cause at least one of said jacketed tension members to engage with at least 5% of said first diameter (d1);

said jacket of said tension members being made of a first elastomer material; and, said back layer being formed from a second elastomer material which is different from said first elastomer material; and, said jacket of said tension members being given a uniform thickness around each respective tension member.

* * * * *